2,983,687

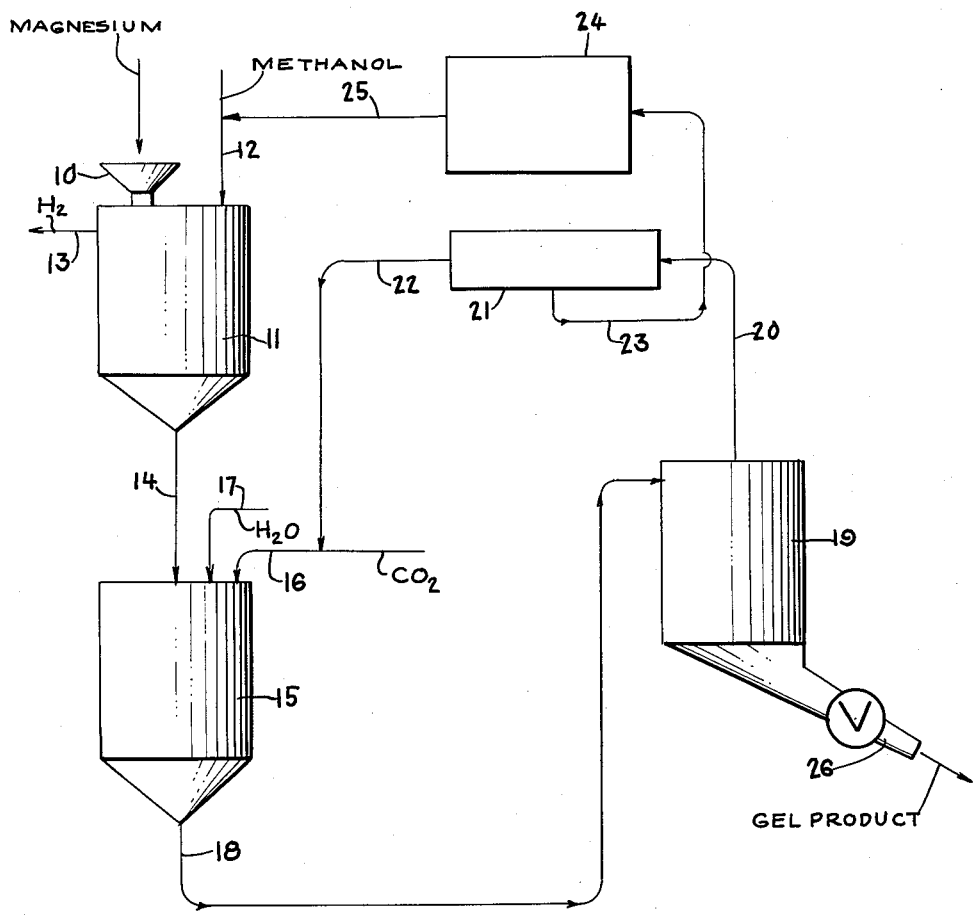

MODIFIED MAGNESIUM CARBONATE GEL AND METHOD FOR PREPARATION THEREOF

Herbert Myers, Delaware Township, Camden County, and Ferdinand P. Otto, Woodbury, N.J., assignors to Socony Mobil Oil Company, Inc., a corporation of New York Filed Dec. 18, 1958, Ser. No. 781,327

7 Claims. (Cl. 252—316)

This invention relates to a high surface area modified magnesium carbonate gel and method for its preparation. More particularly, the present invention is concerned with an amorphous magnesium carbonate gel modified by the presence therein of not more than an equimolar amount of a magnesium hydroxy alcoholate of an alcohol of less than 6 carbon atoms, and characterized by a surface area within the approximate range of 500 to 700 square meters per gram and to a commercially attractive process for its manufacture.

Normal magnesium carbonate occurs in nature as the mineral, magnesite. This natural carbonate and also the double carbonate with calcium, dolomite, $$CaCO_3 \cdot MgCO_3$$

are used for the commercial production of carbon dioxide. A basic carbonate, $Mg_4(OH)_2(CO_3)_3 \cdot 3H_2O$, is precipitated when an alkali carbonate is added to magnesium ion. The precipitated basic salt is used in medicine under the name "magnesia alba," partly as a mild alkali and partly for the physiological action of the magnesium ion. Considerable quantities of this compound are consumed in the preparation of tooth powder and of silver polish.

In accordance with the present invention, a new modified magnesium carbonate has been discovered. Thus, it has been found that an amorphous magnesium carbonate-magnesium hydroxy alcoholate gel, characterized by a high surface area in the approximate range of 500 to 700 square meters per gram can be produced. In contradistinction to the product described herein, magnesium carbonates occurring in nature or prepared by previously known procedures are crystalline with surface areas of less than 100 square meters per gram.

Due to the highly porous adsorptive character of the modified magnesium carbonate gel prepared in accordance with the present invention, such product is useful in a variety of applications wherein the previously known forms of magnesium carbonates were totally inadequate. Thus, the high surface area modified magnesium carbonate gel described herein may suitably be employed as a desiccant, an adsorbent, a catalyst support and as a polymerization, or dehydration catalyst useful for example in promoting the polymerization of ethylene oxide and the dehydration of alcohols.

The process for preparing the high surface area modified magnesium carbonate gel of the present invention comprises the reaction of magnesium metal in a low molecular weight alcohol containing less than 6 carbon atoms to yield a magnesium dialcoholate of such alcohol. The resulting alcoholic solution of magnesium dialcoholate, is then contacted with carbon dioxide, to yield a solution containing a magnesium alkoxy carbonate. Water is added to effect at least partial hydrolysis of the said alkoxy carbonate, forming the modified magnesium carbonate product, the alcohol and carbon dioxide. The resulting alcoholic gel of modified magnesium carbonate is heated at a temperature not exceeding about 300° F. to remove uncombined solvent alcohol and to yield a residual product of amorphous, high surface area magnesium carbonate modified by the presence therein of a magnesium hydroxy alcoholate of an alcohol of less than 6 carbon atoms.

In another embodiment, the present invention affords a cyclic process for manufacture of the high surface area modified magnesium carbonate gel by effecting reaction of magnesium metal in an alcohol containing less than 6 carbon atoms to yield a magnesium dialcoholate, contacting the resulting solution with carbon dioxide to form a solution containing a magnesium alkoxy carbonate, adding water to at least partially hydrolyze the said alkoxy carbonate, yielding the modified magnesium carbonate product, the alcohol and carbon dioxide, recycling said carbon dioxide to contact with the aforementioned solution of the magnesium dialcoholate, heating the remaining alcoholic gel of modified magnesium carbonate at a temperature not exceeding about 300° F. to remove the alcohol and to yield a residual product of amorphous, high surface area magnesium carbonate modified by the presence therein of a magnesium hydroxy alcoholate of an alcohol of less than 6 carbon atoms, recovering, dehydrating and recycling the alcohol so removed to contact with the aforesaid magnesium metal.

It is of interest to note that the carbonates of alkaline earth metals, other than magnesium, prepared in an analogous manner did not possess the high surface area, characterizing the modified magnesium carbonate described herein. The process of the invention accordingly appears to be specific for the production of a high surface area magnesium carbonate-magnesium hydroxy alcoholate gel.

The alcohol employed as a reactant for the magnesium metal is one of low molecular weight, generally containing less than 6 carbon atoms. Representative alcohols include, for example, methanol, ethanol, propanol, isopropanol, butanol, isobutanols, pentanol and isopentanols. Of this group methanol is accorded preference.

The magnesium metal is suitably contacted with the alcohol in a finely divided state to effect reaction thereof within a reasonable time. Also, it is generally desirable to facilitate reaction of the magnesium metal by maintaining the alcohol at an elevated temperature, preferably under conditions of reflux.

The resulting alcoholic solution of magnesium dialcoholate is contacted with sufficient gaseous carbon dioxide to effect at least partial conversion of the said dialcoholate to magnesium alkoxy carbonate. In some instances it may be desirable for such purpose to saturate the magnesium dialcoholate solution with carbon dioxide. Generally, however, it is not essential that the dialcoholate solution be saturated with carbon dioxide but only that sufficient amount of carbon dioxide be present to bring about at least partial conversion of the dialcoholate to magnesium alkoxy carbonate. The molar ratio of carbon dioxide to magnesium accordingly will generally be at least about 0.5 and ordinarily in the approximate range of 1 to 2.

The addition of water is a necessary step in the process. It has been established that gelation will not occur if the molar ratio of water to magnesium is less than about 0.6. Preferably, the molar ratio of water to magnesium is within the range of 0.6 to 1.5. The addition of water may take place either before or after the carbonation step. It would appear that the function of the water is to effect at least partial hydrolysis of the formed magnesium alkoxy carbonate, yielding the modified magnesium carbonate, the alcohol and carbon dioxide. The desired hydrolysis is effected rapidly at elevated temperatures or more slowly, preferably with agitation at room temperature. On heating, the solution rapidly undergoes conversion to a clear gel. Further heating at a temperature below the melting point of the modified magnesium carbonate product and generally within the range of 200 to 300° F. effects removal of the solvent alcohol to yield a pale yellow, amorphous, vitreous appearing modified magnesium carbonate of high surface area. Exposure of the modified magnesium carbonate gel during the above heating to a temperature exceeding about 300° F. results in a product of lower surface area and accordingly is to be avoided.

Utilizing methanol as the alcohol and without intending to be limited by any theory, it would appear that the following reactions are involved, at least to some extent, in the process of the hereindescribed process:

(1) $4Mg + 8CH_3OH \rightarrow 4Mg(OCH_3)_2 + 4H_2$
(2) $4Mg(OCH_3)_2 + 8CO_2 \rightarrow 4Mg(OCH_3)_2(CO_2)_2$
(3) $4Mg(OCH_3)_2(CO_2)_2 + 4H_2O \rightarrow$
    $3MgCO_3 \cdot Mg(OH)OCH_3 + 7CH_3OH + 5CO_2$ Thus, in accordance with Equation 1, magnesium is reacted in methanol to yield magnesium dimethylate and hydrogen. The magnesium dimethylate so obtained is treated in accordance with Equation 2 with carbon dioxide to yield magnesium methoxy carbonate. The latter product is hydrolyzed upon contact with water and heating in accordance with Equation 3 to yield the modified magnesium carbonate gel product, methanol and carbon dioxide.

The modified magnesium carbonate gel product produced in accordance with the process described herein may be characterized by the following general formula:

$$aMgCO_3 \cdot bMg(OH)OR$$

where R is an alkyl radical containing from 1 to 5 carbon atoms $a$ and $b$ are integers, with the ratio of $a$ to $b$ being between 1 and 5. In particular, the modified magnesium carbonate gel product is defined by the formula:

$$aMgCO_3 \cdot bMg(OH)OCH_3$$

where $a$ and $b$ have the above designated significance.

The process of the invention may be carried out in a cyclic operation as shown in the highly schematic figure of the attached drawing.

Referring more particularly to this figure, finely divided magnesium metal is introduced through inlet 10 to vessel 11. An alcohol having less than 6 carbon atoms, for example, methanol is introduced to vessel 11 through conduit 12. The temperature in vessel 11 may be controlled by suitable means not shown. Hydrogen is removed from vessel 11 through outlet 13. The resulting solution of magnesium dimethylate formed is conducted from the bottom of vessel 11 through line 14 to reactor 15. Gaseous carbon dioxide is introduced into said reactor through line 16, yielding a solution containing a magnesium methoxy carbonate. A suitable quantity of water is introduced to vessel 15 through conduit 17 bringing about at least partial hydrolysis of the methoxy carbonate. The resulting reaction mixture is removed from the bottom of reactor 15 through line 18 and pumped by means, not shown, to vessel 19 provided with suitable heating means. During hydrolysis and heating, carbon dioxide and methanol are released and pass overhead from vessel 19 through line 20 to condenser 21. Gaseous carbon dioxide passes from the condenser through line 22 and is recycled to line 16 for further carbonation use. Wet methanol flows from condenser 21 through conduit 23 and passes to a drying vessel 24 wherein water is removed from the methanol. The dried methanol is thereafter recycled through line 25 and conduit 12 to vessel 11. The product consisting essentially of amorphous high surface area modified magnesium carbonate gel is withdrawn from vessel 19 through outlet 26.

The following example will serve to illustrate the method of the invention without limiting the same:

EXAMPLE 1

A methanol solution of magnesium dimethylate was prepared by reacting 272 grams of magnesium turnings in 6800 ml. of refluxing anhydrous methanol, cooling and then filtering through diatomaceous earth.

Six thousand and seventy grams (8.9 moles) of the above magnesium dimethylate solution containing 3.5 percent by weight magnesium was carbonated at 10 to 15° C. to a carbon dioxide:magnesium ratio of 1.5, corresponding to 585 grams (13.3 moles) of carbon dioxide. The resulting clear solution was then treated with 160 ml. (8.9 moles) of water, transferred to trays and the methanol removed by heating in a steam oven at 260° F. for 16 hours. The solids obtained in this manner were pale yellow with a vitreous appearance. Upon analysis, the amorphous solid was shown to be a magnesium carbonate-magnesium hydroxy methylate characterized by the approximate formula: $3MgCO_3 \cdot Mg(OH)OCH_3$ and a surface area of 576 square meters per gram.

The modified magnesium carbonate gel product resulting from the above-described process has been found to possess good adsorption properties for both water and hydrocarbons and thus to be valuable for use as a desiccant and as a hydrocarbon adsorbent.

Evaluation of the high surface area modified magnesium carbonate gel product as a desiccant was carried out in a test performed in a room maintained at 70° F. and 50 percent relative humidity. In this test, the desiccant, is heated to 400° F. for about 3 hours to accomplish regeneration. After cooling, the desiccant is weighed in tared U tubes which are then connected to vessels containing various sulfuric acid-water mixtures depending upon the relative humidity desired. An air stream is passed through these vessels (3) containing the sulfuric acid-water mixtures and into the U tube. The end point is taken as the time when there is no further change in weight of the U tube upon the passage through it of additional air. The weight change of the U tube is taken as water and calculated as a percent of the original dry weight of the desiccant used.

The comparative results at 40 percent and 80 percent relative humidity for the above prepared modified magnesium carbonate gel product and activated alumina were obtained and are set forth in Table I below:

*Table I*

| | Equilibrium Adsorption Capacity, Percent by Weight | |
|---|---|---|
| | 40% Relative Humidity | 80% Relative Humidity |
| Modified Magnesium Carbonate Gel (Product of Example 1) | 15 | 29 |
| Activated Alumina | 10 | 21 |

It will be evident from the foregoing results that the modified magnesium carbonate gel product described herein is an effective desiccant and, in fact, affords better results under comparable conditions than a desiccant of activated alumina.

Evaluation of the high surface area modified magnesium carbonate gel product as an adsorbent was carried out in a test for determination of the equilibrium adsorptive capacity of such gel for hydrocarbons. In these studies, a vacuum desiccator was used to which was attached a Zimmerli gauge, a sleeve valve with a line to a vacuum pump and a sorbate flask which was separated from the desiccator by a stopcock. A weighed sample of the adsorbent was placed in the desiccator which had been previously evacuated to maximum vacuum with the sorbate valve open to remove air from the sorbate flask and then with the sorbate valve closed to remove any hydrocarbon vapor from the desiccator itself. The desiccator was then evacuated to maximum vacuum, shut off and the sorbate vapor introduced into the desiccator to a pressure somewhat less than the equilibrium vapor pressure of the sorbate at 30° C. The pressure was maintained essentially constant by periodically opening and closing the sorbate stopcock with the end point being reached when the pressure remained constant over a one-half hour period. The increase in weight of the sample was calculated as a percent of the original weight and reported in terms of grams hydrocarbon adsorbed per 100 grams of adsorbent.

The results obtained utilizing as the hydrocarbon charge stock: cyclohexane, n-hexane and benzene respectively are set forth in Table II below:

Table II

|  | | Equilibrium Adsorption Capacity, Grams Adsorbed/ 100 grams Adsorbent |
|---|---|---|
| Modified Magnesium Carbonate Gel (Product of Example 1) | Cyclohexane | 20.3 |
|  | n-Hexane | 23.4 |
|  | Benzene | 18.8 |

The above results show that the modified magnesium carbonate gel product described herein is an effective adsorbent for hydrocarbons.

It will be understood that the above description is merely illustrative of preferred embodiments of the invention of which many variations may be made within the scope of the following claims by those skilled in the art without departing from the spirit thereof.

We claim:

1. An amorphous modified magnesium carbonate gel having a surface area within the approximate range of 500 to 700 square meters per gram characterized by the formula:

$$aMgCO_3 \cdot bMg(OH)OCH_3$$

where $a$ and $b$ are integers, with the ratio of $a$ to $b$ being between 1 and 5.

2. An amorphous modified magnesium carbonate gel having a surface area between about 500 and about 700 square meters per gram characterized by the approximate formula:

$$3MgCO_3 \cdot Mg(OH)OCH_3$$

3. A cyclic process for preparing an amorphous modified magnesium carbonate gel characterized by a high surface area which comprises preparing a methanol solution of magnesium dimethylate by reaction of magnesium metal with methanol, contacting the resulting solution with an amount of gaseous carbon dioxide such that the molar ratio of carbon dioxide to magnesium is at least 0.5, adding water to an extent such that the molar ratio of water to magnesium is at least 0.6 with accompanying formation of a modified magnesium carbonate gel product, carbon dioxide and methanol, heating the product mixture so obtained to remove the methanol therefrom at a temperature not exceeding about 300° F., recycling the carbon dioxide formed to contact with the aforesaid solution of magnesium dimethylate, recovering and recycling the methanol so removed to contact with the aforesaid magnesium metal, yielding as a residual product said amorphous modified magnesium carbonate gel of high surface area.

4. A process for preparing an amorphous modified magnesium carbonate gel characterized by a high surface area which comprises preparing a methanol solution of magnesium dimethylate by reaction of magnesium metal with methanol, contacting the resulting solution with an amount of gaseous carbon dioxide such that the molar ratio of carbon dioxide to magnesium is at least 0.5, adding water to an extent such that the molar ratio of water to magnesium is at least 0.6, heating the resulting product mixture at a temperature not exceeding about 300° F. to remove liquid therefrom and to yield the aforesaid amorphous modified magnesium carbonate gel product.

5. A process for preparing an amorphous modified magnesium carbonate gel characterized by a high surface area which comprises preparing a methanol solution of magnesium dimethylate by reaction of magnesium metal with methanol, adding water to an extent such that the molar ratio of water to magnesium is at least 0.6, contacting the resulting solution with an amount of gaseous carbon dioxide such that the molar ratio of carbon dioxide to magnesium is at least 0.5, heating the resulting product mixture at a temperature not exceeding about 300° F. to remove liquid therefrom and to yield the aforesaid amorphous modified magnesium carbonate gel product.

6. A process for preparing an amorphous modified magnesium carbonate gel characterized by a high surface area which comprises preparing a methanol solution of magnesium dimethylate by reaction of magnesium metal with methanol, contacting the resulting solution with an amount of gaseous carbon dioxide such that the molar ratio of carbon dioxide to magnesium is within the approximate range of 1 to 2, adding water to an extent such that the molar ratio of water to magnesium is within the range of 0.6 to 1.5, heating the resulting product mixture at a temperature not exceeding about 300° F. to remove liquid therefrom and to yield the aforesaid amorphous modified magnesium carbonate gel product.

7. A process for preparing an amorphous modified magnesium carbonate gel characterized by a high surface area which comprises preparing a methanol solution of magnesium dimethylate by reaction of magnesium metal with methanol, adding water to an extent such that the molar ratio of water to magnesium is within the range of 0.6 to 1.5, contacting the resulting solution with an amount of gaseous carbon dioxide such that the molar ratio of carbon dioxide to magnesium is within the approximate range of 1 to 2, heating the resulting product mixture at a temperature not exceeding about 300° F. to remove liquid therefrom and to yield the aforesaid amorphous modified magnesium carbonate gel product.

References Cited in the file of this patent

UNITED STATES PATENTS

| 2,491,033 | Byrns et al. | Dec. 13, 1949 |
| 2,692,239 | Hunter et al. | Oct. 19, 1954 |